F. W. B. SCHORADT.
ADDING MACHINE.
APPLICATION FILED FEB. 16, 1915. RENEWED FEB. 27, 1919.
1,313,231.
Patented Aug. 12, 1919.
4 SHEETS—SHEET 1.
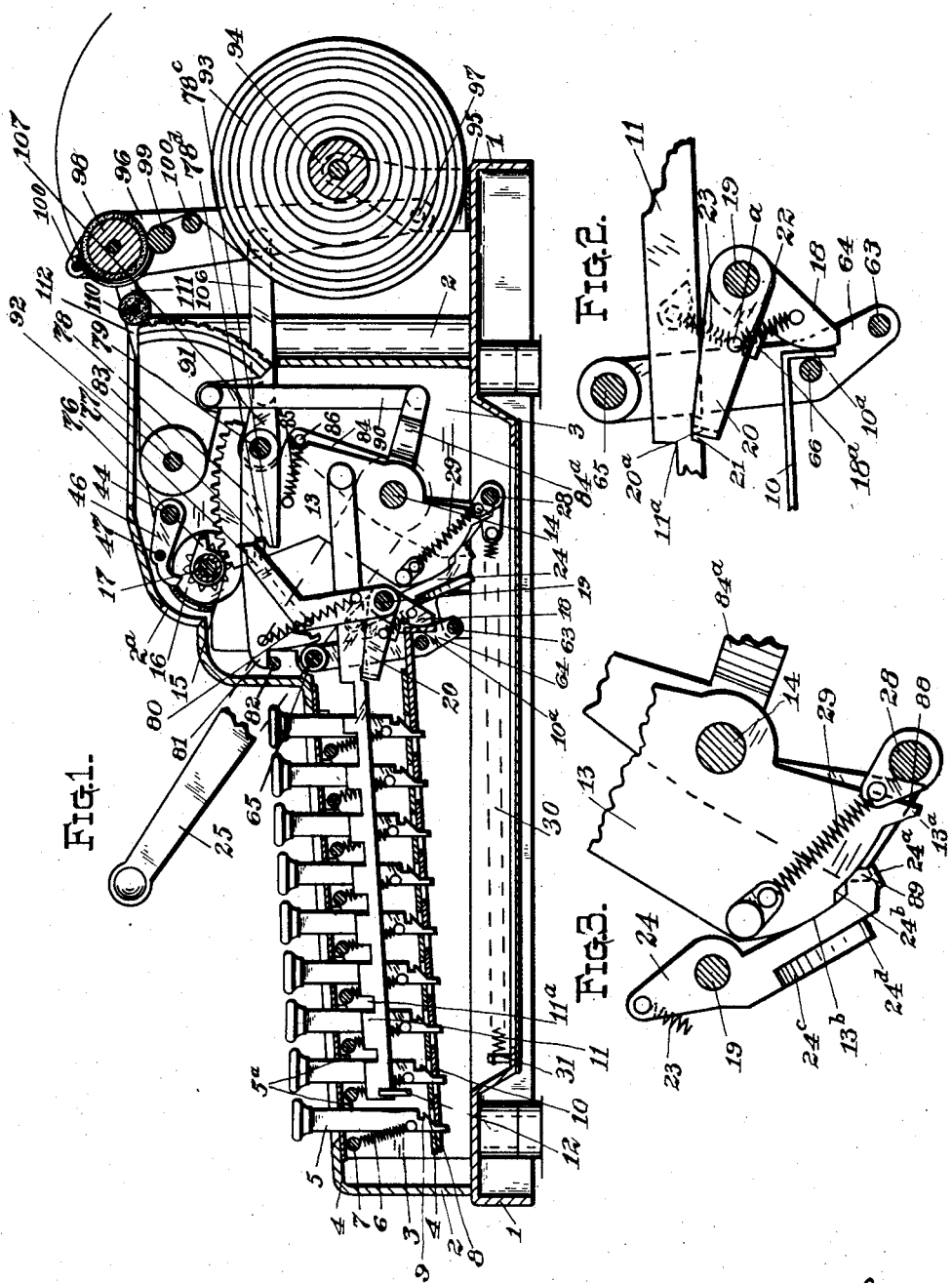

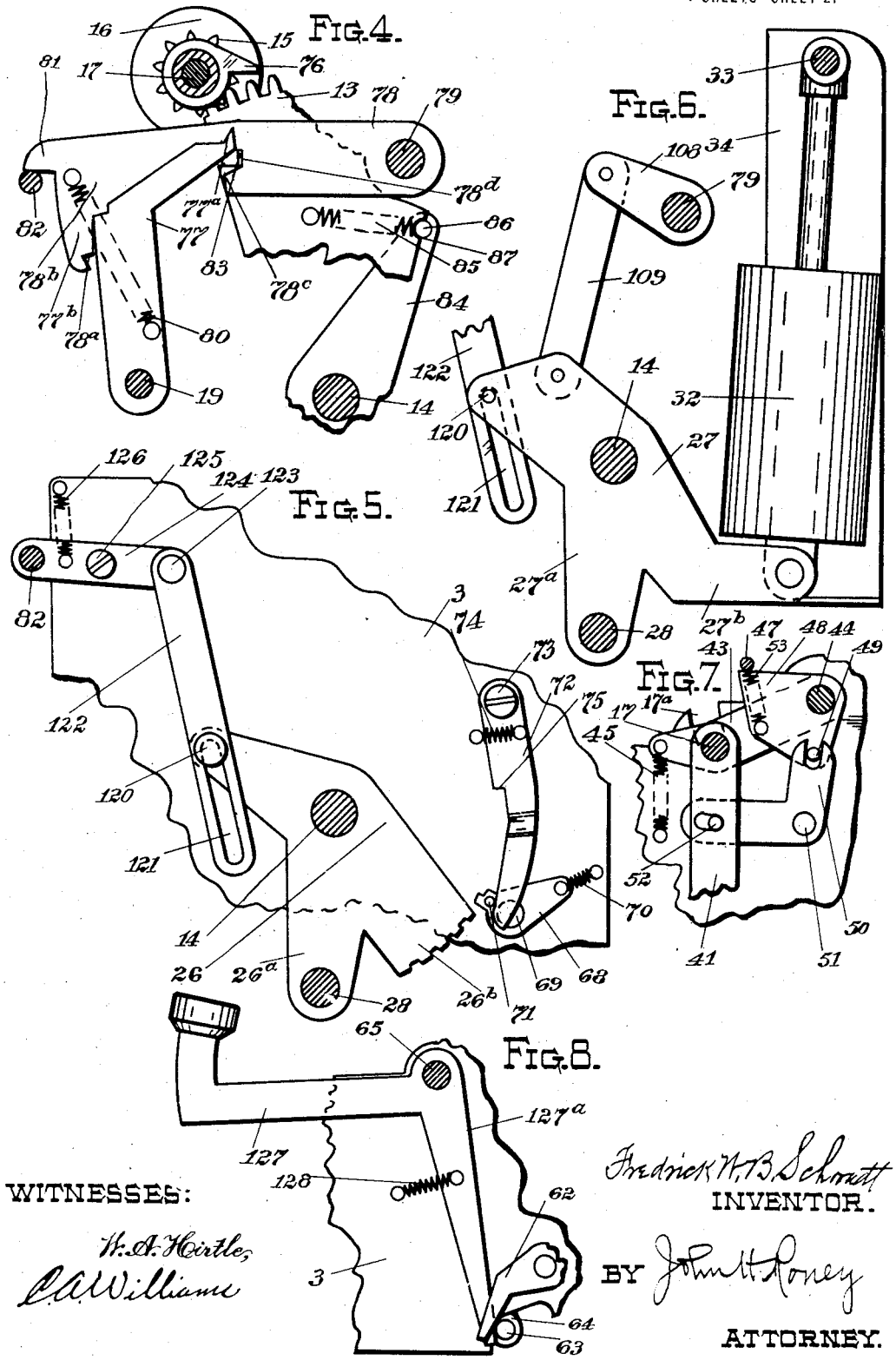

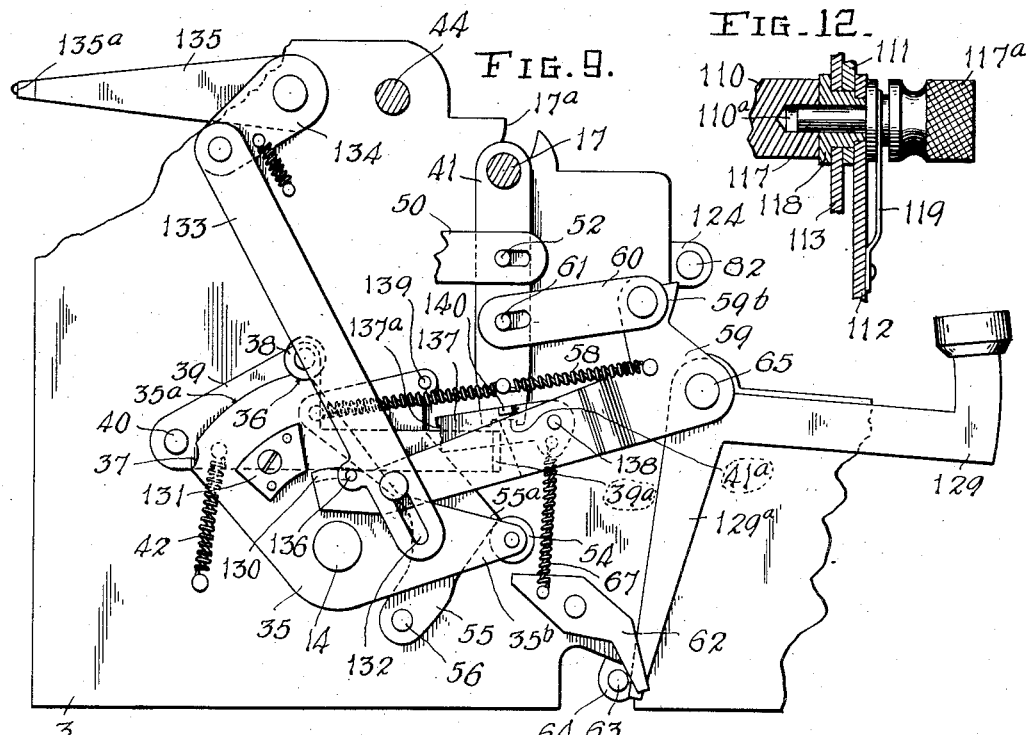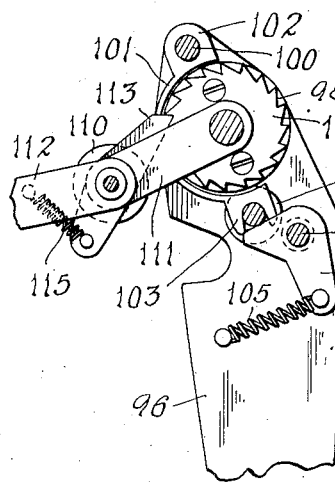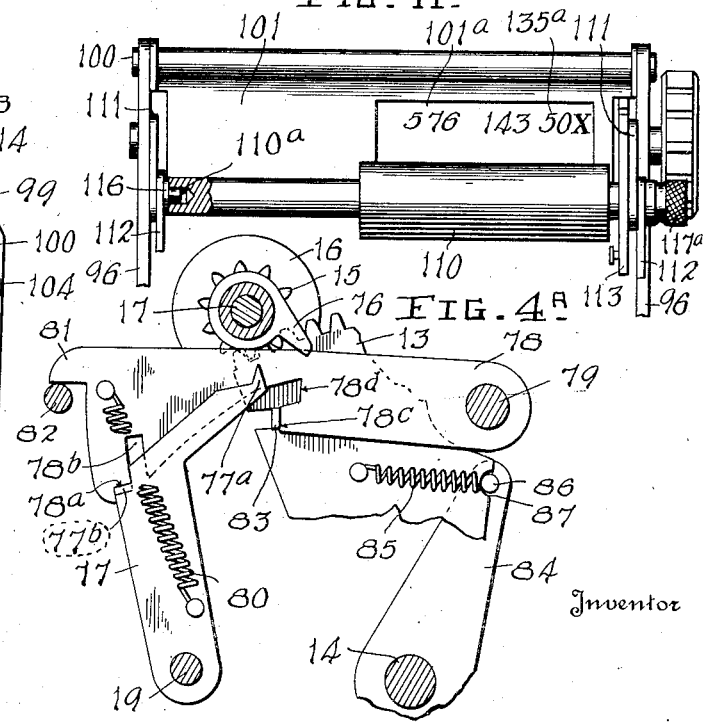

F. W. B. SCHORADT.
ADDING MACHINE.
APPLICATION FILED FEB. 16, 1915. RENEWED FEB. 27, 1919.

1,313,231.

Patented Aug. 12, 1919.
4 SHEETS—SHEET 4.

UNITED STATES PATENT OFFICE.

FREDRICK W. B. SCHORADT, OF KITTANNING, PENNSYLVANIA, ASSIGNOR TO SYDNEY L. KAUFMAN, OF KITTANNING, PENNSYLVANIA.

ADDING-MACHINE.

1,313,231. Specification of Letters Patent. Patented Aug. 12, 1919.

Application filed February 16, 1915, Serial No. 8,545. Renewed February 27, 1919. Serial No. 279,601.

*To all whom it may concern:*

Be it known that I, FREDRICK W. B. SCHORADT, a citizen of the United States, residing at Kittanning, in the county of Armstrong and State of Pennsylvania, have invented a new and useful Improvement in Adding-Machines, of which improvement the following is a specification.

The present invention relates to certain new and useful improvements in adding machines and has for its object the production of a device of this character, in which the number of parts is reduced to a minimum, and in which simplicity and compactness in construction are attained.

With these and other objects in view, the invention consists in certain novel constructions and arrangements of the parts as will more fully appear as the description proceeds, the novel features thereof being pointed out in the appended claims.

For a full understanding of the invention, reference is to be had to the following description and accompanying drawings, in which :—

Figure 1 is a longitudinal sectional view through an adding and listing machine constructed in accordance with the invention.

Fig. 2 is an enlarged detail view of the pawl mechanism for locking one of the registering slides.

Fig. 3 is a similar view of the lower end of one of the registering sectors and the corresponding locking pawl of the printing mechanism.

Fig. 4 is a detail view showing the carrying mechanism of the numeral wheels. Figs. 1, 2, 3 and 4 are shown carried.

Figure 13:
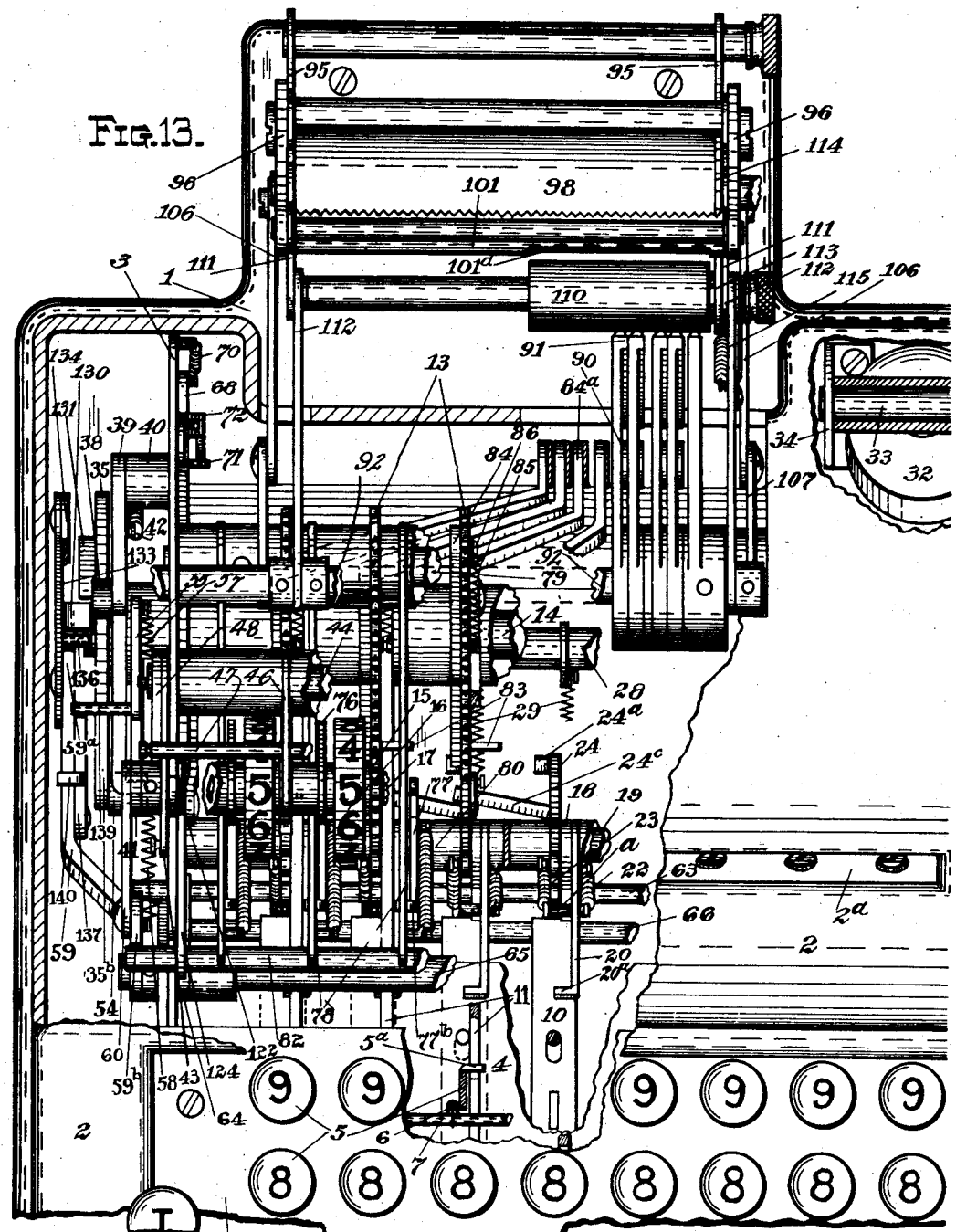

Fig. 4ª is a view similar to Fig. 4, showing the position of the parts before the carrying mechanism has been actuated by the trip arm.

Fig. 5 is an elevation of the operating plate and coöperating mechanism arranged on the inside of the supporting frame at the left hand side of the machine.

Fig. 6 is a similar view of the operating plate and coöperating mechanism mounted on the inside of the supporting frame at the right hand side of the machine.

Fig. 7 is a detail view of a portion of the mechanism for lifting the shaft upon which the numeral wheels are mounted, and the mechanism and rod which lifts the numeral wheel locking pawls out of mesh.

Fig. 8 is a detail view of the error key.

Fig. 9 is a side elevation of one of the main operating cam members and the coöperating mechanism as mounted upon the exterior of the side plates of the supporting frame.

Fig. 10 is a detail sectional view through the upper end of the printing carriage.

Fig. 11 is a front elevation of the printing carriage, portions being broken away and shown in section.

Fig. 12 is a sectional view of the detachable mounting at one end of the inking roller.

Fig. 13 is a plan view with portions cut away so as to show as many parts as possible.

Corresponding and like parts are referred to in the following description and indicated in all the views of the drawings by the same reference characters.

Specifically describing the present embodiment of the invention, the numeral 1 designates the base upon which the supporting frame is mounted and, 2, the casing within which the mechanism is inclosed. The supporting frame which is mounted upon the base comprises a pair of corresponding side plates, 3. Toward the front of the machine the side plates, 3, are connected by a pair of transversely disposed superposed guide plates, 4, having corresponding openings therein within which the keys, 5, are slidably mounted so as to have an up and down movement. The bank of keys, 5, is arranged in longitudinal columns, there being one column for each digit of any number which it may be desired to charge into the machine and nine keys in each column, the keys of each column being numbered consecutively from one to nine inclusive. These keys, 5, are normally held in a raised position by means of coil springs, 6, the lower ends of the springs being connected to the keys while the upper ends thereof are connected to rods 7 extending transversely across the frame. The lower end of each of the keys, 5, is formed with a beveled nose, 8, and a notch, 9, and the beveled noses of the keys of each column pass through openings in a key locking slide, 10, which is mounted under the lower plate 4. The rear end of each of the key locking slides, 10, terminates in a downwardly extending finger, 10ª, and when any one of the keys in any of the columns is depressed, the beveled nose of the depressed key forces the key locking slide, 10, rearwardly until the key has reached the downward limit of its movement, at which time the slide, 10, engages the notch, 9, of the key so as to lock the key in a lowered position.

A registering slide 11 extends longitudinally along each column of the keys, 5, the forward ends of the slides being mounted in a comb, 12, while the rear ends thereof are pivotally connected to registering sectors, 13, one of the latter being provided for each column of keys. The upper edge of each of the registering slides, 11, is shown as formed with a series of notches, 11ª, which, together with the forward end of the slide, provide stop shoulders adapted to be engaged by laterally projecting stop arms, 5ª, upon the keys, 5, when the said keys are depressed. These stop shoulders provided by the notches, 11ª, and the end of the registering slide, 11, have such a relation to the stop arms, 5ª, of the keys, 5, that the magnitude of the forward sliding movement of the registering slide, 11, before being arrested by engagement of the stop shoulder with the stop arm 5ª, of the depressed key depends upon the numerical value of that particular key which was depressed. By reference to Fig. 1 it will be observed that the notches, 11ª, gradually increase in size from the forward end of the registering slide, 11, to the rear end thereof, and as the numerical value of the keys also increases from the front to the rear of the machine, the slide will move forward a greater amount before being checked when a key of high numerical value is depressed than when a key of low numerical value is depressed. In other words, the amount which the registering slide, 11, moves forward before being checked is exactly proportionate to the value of the key which was depressed.

The rear ends of the registering slides, 11, are pivotally connected to the respective registering sectors, 13, which are loose upon the main operating shaft, 14, and mesh at their upper ends with the pinions, 15, of number wheels, 16. One of the number wheels, 16, is provided for each column of the keys and these number wheels are loose upon a shaft, 17, which is mounted so as to be moved bodily upward for the purpose of disengaging the pinions, 15, from the teeth of the registering sectors, 13. Each of the pinions, 15, has exactly ten teeth and the periphery of each of the number wheels, 16, has the digits 0 to 9, inclusive, consecutively marked thereon. These digits are adapted to be rotated successively into position so as to be visible through the view opening, 2ª, of the casing, 2, the characters upon the several number wheels displayed through this view opening indicating the total of all the numbers charged into the machine during the particular operation.

The finger, 10ª, at the rear end of each of the key locking slides, 10, engages an arm, 18, which is loose upon a transverse shaft, 19. (See Fig. 2). A nose, 18ª, which is a part of arm, 18, rests against spring post, a, the purpose of which is to neutralize the action of spring, 22, when locking slides, 10, are inactive. Loose upon the same shaft, 19, and arranged adjacent the arm, 18, is a pawl, 20, having a laterally projecting nose, 20ª, at the extremity thereof adapted to engage a notch, 21, in the corresponding registering slide 11. A spring, 22, connects the arm, 18, to the pawl, 20, and in a similar manner a second spring, 23, of less strength than the spring, 22, connects the locking pawl, 20, of the registering slide to a pawl, 24, (see Fig. 3) which is also loose on the shaft, 19, and controls the printing mechanism. When the key locking slide, 10, of one of the columns is moved rearward by the depression of one of the keys, the finger, 10ª, at the end thereof (see Fig. 2) will engage the spring arm, 18, and swing the same downwardly and rearwardly. Owing to the fact that the spring, 22, is stronger than the spring, 23, this will result in swinging the locking pawl, 20, downwardly so as to disengage the same from the notch, 21, of the registering slide, 11, and release the latter. This locking pawl, 20, will prevent registering slide, 11, from moving forward on a column not operated upon, but space is allowed for backward movement of registering slide, 11, in case of carrying.

At the right hand side of the machine a main operating lever, 25, is rigid with the main shaft, 14. Adjacent the inner face of the left hand side plate, 3, of the supporting frame, an operating plate, 26, is rigid with the main shaft, 14, while adjacent the inner face of the right hand side plate, 3, of the supporting frame, an operating plate, 27, is rigid with the main shaft, 14. (See Figs. 5 and 6.) These two operating plates, 26 and 27, are formed with corresponding downwardly extending arms 26ª, and, 27ª, respectively, which are connected by a transverse bar, 28. Tension springs, 29, connect this bar, 28, to the several registering sectors, 13, while resetting springs, 30, which extend along the top of the base, 1, are connected at their rear ends to the bar, 28, and at their forward ends to posts, 31, projecting from the base. With this construction, it will be seen that when the main operating lever, 25, is swung downwardly the main shaft, 14, and the operating plates, 26 and 27, rigid therewith, will be simultaneously rotated so as to swing the transverse bar, 28, toward the rear of the machine and place all of the springs, 29, under tension. This will result in swinging the upper ends of all the registering sectors, 13, whose respective registering slides, 11, have been released toward the front of the machine, the amount of the rotary movement of the sectors, depending upon the magnitude of the movement of the slides, 11, which, as has been previously explained, depends in turn upon the numerical value of those particular keys which were depressed. The transverse bar, 8, is always moved rearward the same amount at each actuation of the main operating lever, 25, although the spring connections, 29, between the said bar and the registering sectors, 13, admit of the registering sectors either remaining stationary or moving the necessary amount. The operating plate, 27, at the right hand side of the machine (see Fig. 6) is formed with an arm, 27$^b$, which is connected to a dash pot, 32, said dash pot serving as a cushioning means to absorb shocks and jars such as are incident to a rapid operation of the machine.

The upper end of the dash pot is shown as pivotally connected to a short rod, 33, extending between the side plate, 3, of the supporting frame and a bracket, 34, spaced therefrom.

Before the forward movement of the registering sectors, 13, the shaft, 17, upon which the numeral wheels, 16, are mounted, is moved bodily upward so as to disengage the pinions, 15, from the teeth of the registering sectors. For this purpose, each end of the main operating shaft, 14, is provided, upon the exterior of the corresponding side plate, 3, of the supporting frame, with a cam plate, 35. (See Fig. 9.) Each of these cam plates is formed with a cam surface, 35$^a$, having the respective notched seats, 36 and 37, at opposite ends thereof. A roller, 38, upon a cam actuated lever, 39, is adapted to ride upon the cam surface, 35$^a$, and successively enter the notched seats, 36 and 37, during the operation of the machine. This lever, 39, has one end thereof pivoted to the side plate, 3, of the supporting frame, as indicated at 40, while the opposite end thereof is provided with a laterally projecting nose, 39$^a$, adapted to engage a notched seat, 41$^a$, in the lower end of an upright hanger, 41, pendent from the shaft, 17, upon which the numeral wheels, 16, are journaled. A spring, 42, normally swings the cam actuated lever downwardly into operative position, and the roller, 38, is normally seated in the notch, 36, at one end of the cam surface, 35$^a$. However, upon the initial downward movement of the main operating lever, 25, the roller, 38, is lifted from the seat, 36, so as to ride upon the cam surface, 35$^a$. This results in swinging the lever, 39, upwardly so that the nose, 39$^a$, thereof lifts the hanger, 41, and shaft, 17, thereby raising the pinions, 15, of the numeral wheel, 16, which are mounted upon the said shaft, 17, out of mesh with the registering sectors, 13.

The ends of the shaft, 17, operate in slots, 17$^a$, formed in the side plates, 3, of the frame, and are mounted loosely in arms, 43, arranged at opposite sides of the frame and pivoted upon the shaft, 44. (See Figs. 7 and 9.) Springs, 45, which are connected to the free ends of the arm, 43, normally tend to swing the same downwardly so that the notched seats, 41$^a$, in the lower ends of the hangers, 41, pendent from opposite ends of the shaft, 17, are normally in a yielding engagement with the noses, 39$^a$, of the respective levers, 39.

A locking pawl, 46, is provided for each of the pinions, 15, said locking pawls being mounted upon a shaft, 44, and being all connected by the rod, 47, which passes through the same. The ends of this rod, 47, are supported upon plates, 48, loose upon the shaft, 44. Each of the plates, 48, has a pin and slot connection, 49, with one arm of a bell crank lever, 50, which is pivoted, at 51, upon the frame, the opposite arm of the bell crank having a pin and slot connection, 52, with the corresponding hanger, 41. (See Fig. 7.) Springs, 53, connect the ends of the rod, 47, to the plates, 48, and normally tend to hold the rod in a yielding engagement with the said plates. When the hangers, 41, are moved upwardly by the initial movement of the main operating lever, 25, as has been previously explained, the bell crank lever, 50, will swing the plates, 48, downwardly so that the rod, 47, will be lowered and the locking pawls, 46, caused to engage the teeth of the pinions, 15, of the numeral wheels before the said pinions are completely disengaged from the teeth of the registering sectors, 13. The numeral wheels, 16, and pinions, 15, are thus moved bodily upward upon the initial downward movement of the main operating lever, 25, and locked against rotation while in this raised position, springs, 53, absorbing the excess motion of plates, 48.

The main operating cam plates, 35, at each side of the machine are each provided with extensions, 35$^b$, having rollers, 54, journaled thereon. Upon the forward movement of the cam plate, 35, the rollers, 54, are caused to recede from shoulders, 55$^a$, upon levers, 55, which are pivoted to the main frame at 56. The end of each lever, 55, is connected by a spring, 57, to the corresponding hanger, 41, and this spring tends to swing the hanger in one direction. An oppositely extending spring, 58, which is weaker than the spring, 57, connects the said hanger to a bell crank member, 59, and tends to swing the hanger in the opposite direction. A link, 60, connects one arm of the bell crank member, 59, to the hanger, 41, and has a pin and slot connection, 61, with the latter. The swinging of the hanger, 41, in the direction caused by the tension of the spring, 57, is limited by the pin and slot connection, 52, between the bell crank lever, 50, and the hanger, 41, and also by the pin and slot connection, 61, between the link, 60, and the said hanger. Both of the springs, 57 and 58, are accordingly normally under tension, as indicated by Fig. 9. However, when the cam operating plate, 35, is rotated in a forward direction by the main operating lever, 25, the movement of the roller, 54, away from the shoulder, 55$^a$, of the lever, 55, permits the said lever to move, under the action of the spring, 57, until the upper end thereof engages the hanger, 41. The action of the spring, 58, now tends to swing the hanger, 41, laterally, although the spring, 45, holds the notched seat, 41$^a$, of the hanger, 41, in a sufficiently strong engagement with the nose, 39$^a$, of the lever, 39, to resist this tendency until the downward stroke of the operating lever, 25, has been completed and the roller, 38, of the cam actuated lever, 39, drops into the notch, 37. The nose, 39$^a$, of the said lever then moves away from the seat, 41$^a$, of the hanger, 41, so that the hanger can swing laterally under the action of the spring, 58. As soon as the roller, 38, of the cam actuated lever, 39, drops into the seat, 37, the hanger, 41, and shaft, 17, are lowered into their original position, thereby again bringing the pinions, 15, of the numeral wheels, 16, into mesh with the registering sectors, 13, and lifting the locking pawls, 46, of the pinions, 15 into an inoperative position. Upon the return movement of the main operating lever, 25, the cam actuated lever, 39, will again be swung upwardly as the roller, 38, rises from the seat, 37, upon the cam surface, 35$^a$, of the cam, 35, although it should be remembered that the hanger, 41, was previously swung laterally by the spring, 58, so that the lower end thereof was moved out of the path of the nose, 39$^a$, at the end of the lever, 39. It will be, accordingly, understood that during the return movement of the operating lever, 25, the hanger, 41, and shaft, 17, will not be lifted, but will remain in a lowered position with the pinions, 15, of the numeral wheels in mesh with the toothed upper ends of the registering sectors, 13. The upward return movement of the main operating lever, 25, will also result in the backward rotation of the operating plates, 26 and 27, arranged adjacent the inner faces of the side plates, 3, of the frame and shown by Figs. 5 and 6. The transverse bar, 28, upon being thus moved toward the front of the machine will engage noses, 13$^a$, at the lower ends of those registering sectors, 13, previously operated, so as to return the registering sectors to their original positions. During this return movement of the sectors, the numeral wheels are rotated so as to add the number just charged into the machine to the total previously displayed through the view opening, 2$^a$. In this connection, it will be remembered that the forward movement of each registering sector, 13, is exactly proportionate to the numerical value of the key, 5, which was depressed, and the return movement of each sector is the same in magnitude as the forward movement. The amount of rotation imparted to each numeral wheel, 16, thus corresponds exactly to the numerical value of the depressed key, 5. For instance, should the key, 5, having the digit "3" thereon have been depressed, the numeral wheel, 16, would have been rotated three steps so as to add the quantity three to the number previously displayed thereby.

As the main operating lever, 25, completes its return movement, the rollers, 54, upon the extensions, 35$^b$, of the cam operating plates, 35, engage trip levers, 62, at opposite sides of the machine, said trip levers being arranged to engage the ends of a transverse rod, 63, which is rigidly connected to the lower ends of hangers, 64, pivotally mounted at their upper ends upon a shaft, 65. (See Fig. 2.) The movement of the trip levers, 62, produced at the completion of the return movement of the main operating lever, 25, causes the same to move the rod, 63, toward the rear of the machine. This results in swinging the hangers, 64, rearwardly, and these hangers are connected by a bar, 66, which is arranged immediately in front of the fingers, 10$^a$, of the key locking slides, 10. This rearward swinging movement of the hangers, 64, will accordingly cause the bar, 66, to move the key locking slides, 10, slightly rearward so as to release those keys which were depressed and permit them to be returned to normal position by the springs, 6. When the main operating lever, 25, reaches the extreme limit of its return movement, the rollers, 54, of the cam plates, 55, will have slipped by the ends of the trip levers, 62. Upon the downward movement of the main operating lever, 25, the rollers, 54, of the cam plates, 35, will engage the trip levers, 62, but will slip by the same so as to permit of the levers being returned to their original position by the springs, 67.

Provision is made for preventing the return stroke of the main operating lever, 25, until after it has been first swung downwardly to the extreme limit of its movement. For this purpose the operating plate 26 (see Fig. 5) is formed with a segmental ratchet, 26$^b$, which is engaged by a pawl, 68, pivoted upon the frame at 69. A spring, 70, which is connected to the tail of the pawl, 68, normally holds the pawl yieldingly in operative position so that as the plate, 26, is rotated on the downward movement of the operating lever, 25, the nose of the pawl will coöperate with the teeth of the segmental ratchet, 26$^b$, to prevent any retrograde or backward movement. At the same time a pin, 71, upon the pawl, 68, will engage the end of an arm, 72, pivoted upon the frame at 73, so as to swing the said arm against the action of a spring, 74, and thereby move a stop shoulder, 75, thereon, out of the path of the segmental ratchet, 26$^b$. The pawl, 68, engages the teeth of the segmental ratchet, 26$^b$, to prevent backward movement of the operating lever 25, until the said lever reaches the lower limit of its movement, at which time the pawl clears the segmental ratchet, 26$^b$, and will swing to one side to permit of the return movement of the lever, said return movement being brought about by the springs, 30. As the pawl, 68, thus swings to one side, the arm, 72, will be released and swung by the action of the spring, 74, into such a position that the shoulder, 75, will catch the corner of the segmental ratchet, 26$^b$, to prevent the operating lever, 25, from being pressed down again after it has started upon its return movement. This arrangement insures a full stroke of the lever, 25, at each operation thereof, and eliminates the possibility of error which might otherwise be caused by less than a full stroke being given to the operating lever. On the return movement of lever, 25, pawl, 68, will again engage segmental ratchet, 26$^b$, until the return stroke is completed when it will escape.

In connection with the several numeral wheels, 16, a carrying mechanism is provided so that when the rotation of one of the numeral wheels causes the digit displayed thereon, through the view opening, 2$^a$, to change from "9" to "0," the next succeeding numeral wheel to the left thereof will be rotated one step. Each of the numeral wheels is provided upon the left hand side thereof, with a trip finger, 76, adapted to engage the nose, 77$^a$, of a carrying arm, 77, which is pivoted at its lower end upon the shaft 19. (See Fig. 4). This carrying arm, 77, is provided with a laterally projecting stop arm, 77$^b$, adapted to engage either one of a pair of stepped seats, 78$^a$, or 78$^b$, in a substantially horizontally disposed trip lever, 78, pivotally mounted at its rear end upon a shaft 79. A tension spring, 80, connects the trip lever, 78, to the carrying arm, 77, so as to normally hold the stop arm, 77$^b$, in a yielding engagement with one of the seats, 78$^a$, or 78$^b$. The forward end of the trip lever, 78, is formed with a nose, 81, which overhangs a resetting rod, 82, extending transversely across the machine. It will also be observed that the lower edge of the trip lever, 78, is notched at an intermediate point in its length, to provide a pair of stepped stop shoulders, 78$^c$ and 78$^d$, adapted to coöperate with stop arm, 83, laterally extending from registering sector, 13, to limit the return movement of the adjacent registering sector, 13. A trip finger, 76, carrying arm, 77, trip lever, 78, and a spring, 80, are provided for each of the numeral wheels, 16, and one extra carrying arm, 77, trip lever, 78, and spring, 80, to hold the extreme right hand registering sector, 13, in position. In resetting the carrying mechanism the resetting rod, 82, is moved bodily upward so as to swing the trip levers, 78, upward against the actions of the springs, 80. As soon as the trip levers, 78, have reached the upper limit of their movement, the tension of the springs, 80, swings the carrying arms, 77, forward so that the stop arms, 77$^b$, thereon are moved from the upper stepped seats, 78$^b$, into the lower stepped seats, 78$^a$. In this position of the trip arms, 78, which is indicated by dotted lines on Fig. 5, the forward shoulder, 78$^c$, of the trip lever, 78, is in the path of the stop arm, 83, of the registering sector, 13. When one of the numeral wheels, 16, makes one complete rotation, the trip finger, 76, at the left hand end thereof, will engage the nose, 77$^a$, of the carrying arm, 77, and swing the same rearwardly, thereby causing the stop arm, 77$^b$, thereof, to slide out of the lower seat, 78$^a$, of the trip lever, 78. The spring, 80, then swings the trip lever, 78, downwardly until the upper seat, 78$^b$, is engaged by the stop arm, 77$^b$. This downward swinging movement of the trip lever, 78, lowers the stop shoulder, 78$^c$, thereof, out of the path of the stop arm, 83, and brings the upper stop shoulder, 78$^d$, into the path of the said arm. With this position of the parts, which is indicated by full lines on Fig. 4, the registering sector, 13, of the next succeeding numeral wheel to the left will, upon its return movement, swing rearwardly one step farther than would be possible with the trip lever, 78, in a raised position. This is due to the fact that the stop shoulders, 78$^c$ and 78$^d$, bear a stepped relation to each other so that when the stop arm, 83, engages the shoulder, 78$^b$, the registering sector moves one step farther than when the stop arm engages the stop shoulder, 78$^c$. This additional movement of one step serves to rotate the numeral wheel, 18, one additional step so as to add one unit to the numerical value of the number displayed thereby. With this construction, it will be obvious that for each complete revolution of one of the numeral wheels, 16, the next succeeding numeral wheel to the left thereof is automatically rotated one step forward.

Loosely mounted upon the shaft, 14, adjacent to each of the registering sectors, 13, is a lever, 84, the upper end of the lever being connected by a tension spring, 85, to the corresponding registering sector, 13, and being provided with a stop pin, 86, adapted to engage a seat, 87, in the edge of the registering sector. The lower end of each of the levers, 84, is provided with a nose, 88, projecting into the path of the operating bar, 28, and also with a nose, 89, adapted to be engaged by a laterally projecting arm, 24$^a$, at the end of the before mentioned pawl, 24. It will also be observed that the adjacent edges of the pawl, 24, and registering sector, 13, are provided with the coöperating cam surfaces, 24$^b$, and 13$^b$, respectively. Upon the initial movement of the registering sector, 13, in the operation of the machine, these cam surfaces coöperate with each other to swing the pawl, 24, downwardly so as to disengage the arm, 24$^a$, thereof from the nose, 89, of the lever, 84. (See Fig. 3). The action of the spring, 85, then serves to lock the lever, 84, with the registering sector, 13, so that the two members move in unison. Projecting rearwardly from each of the levers, 84, is a lateral arm, 84$^a$, which is connected by a link, 90, to a printing sector, 91. One of these printing sectors, 91, is provided for each of the numeral wheels 16, and they are all loosely mounted upon the shaft, 92, normally dropping downwardly into inoperative position so that none of the characters thereon will print when the machine is operated. The segmental face of each of the printing sectors has the successive characters "0" to "9", inclusive thereof, the "0" character being at the top of the sector and the character "9" at the bottom of the sector, and the "0" character being normally lowered beyond printing position. Each of the pawls, 24, is provided with a lateral arm, 24$^c$, which projects from the left thereof, and normally engages a seat, 24$^d$, on the next succeeding pawl to the left. It will thus be obvious that when one of the registering sectors, 13, is operated and the coöperating cam surfaces, 24$^b$, and 13$^b$, force the corresponding pawl, 24, downwardly, the arm, 24$^c$, upon the said pawl will act to produce a corresponding downward movement of all of the pawls, 24, to the right of that particular pawl which was operated. All of the pawls thus forced downwardly will be disengaged from the noses, 89, of the corresponding levers, 84, whereupon the springs, 85, will swing the said levers, 84, until the stop pins, 86, thereof engage the seats, 87, of the registering sectors. This results in sending all of the corresponding printing sectors, 91, upwardly so as to bring the "0" characters thereon into printing position. The pawls, 24, and corresponding printing sectors, 91, to the left of that particular pawl, 24, which was operated will not be moved. A continued forward swinging movement of any of the registering sectors, 13, will result in swinging the printing sectors, 91, upward a corresponding amount. As has been previously explained, the forward movement of the various registering sectors, 13, is proportionate to the value of the corresponding keys, 5, which were depressed, and since the levers, 84, move with the registering sectors, 13, it will be obvious that the movement imparted to the corresponding printing sectors, 91, is also proportionate to the numerical value of the keys, 5, which were depressed. For instance, should the key, 5, having a numerical value of nine be depressed in any particular column, the corresponding printing sector, 91, would be swung upwardly nine steps upon the actuation of the machine so as to bring the character "9" thereof into printing position.

The various numbers charged into the machine are printed upon a web, 93, of paper which is unwound from a roll, 94, said roll being mounted between a pair of brackets, 95, projecting from the base, 1, at the rear of the machine. The paper carriage includes a pair of arms, 96, which are pivoted at 97, upon the brackets, 95. (See Fig. 1.) A platen, 98, is mounted between the upper ends of the arms, 96, of the paper carriage and the web of paper passes around the front of the said platen, a pressure roller, 99, being provided for holding the paper in a yielding engagement with the bottom of the platen. The arms, 96, of the paper carriage are connected by upper and lower transverse rods, 100, so as to give the paper carriage a rigid formation. A paper guide, 101, of sheet metal or like material, fits around the front of the platen, 98, being formed with an opening, 101$^a$, through which the portion of the paper upon which the printing is to be done is displayed. (See Fig. 11.) The top of the paper guide, 101, is provided at opposite ends thereof with outstanding ears, 102, engaging the upper rod, 100, while the bottom thereof is provided with corresponding slotted ears, 103, loosely receiving the shaft of the pressure roller, 99. (See Fig. 10.) The said shaft of this pressure roller, 99, is engaged at each end thereof by one arm of a bell crank lever, 104, the opposite arm of the said bell crank lever being engaged by a spring, 105, which tends to force the shaft upwardly so as to hold the pressure roller, 99, in a yielding engagement with the platen. Each side of the printing carriage is connected at an intermediate point in its length by means of a link, 106, to a crank arm, 107, rigid with the shaft, 79. At the right hand side of the machine (see Fig. 6) this shaft, 79, is also provided with a rigid crank arm, 108, which is connected by a link, 109, to the operating plate, 27. When the operating plate, 27, is swung in the operation of the machine, the shaft, 79, is rocked and carries with it the rigid arms, 107, which operate through the link, 106, to draw the paper carriage toward the printing sectors, 91. The forward movement of the paper carriage is brought about with a constantly accelerated speed and when the main operating lever, 25, reaches the lower limit of its movement, the paper upon the platen, 98, is forced against the printing sectors, 91, so as to leave an impression thereon. The printing sectors were previously set so that the number printed upon the paper will correspond with the number charged into the machine through the keys, 5, and upon the return movement of the operating lever, 25, the paper carriage will be swung back to its original position.

An inking roller, 110, is mounted to be moved lightly over the type faces of the printing sectors, 91, upon each actuation of the machine. This inking roller is mounted at its ends between the pivotal connections of links, 111, projecting forwardly from the paper carriage and links, 112, projecting rearwardly from the shaft, 92. There is normally an obtuse angle, with apex downward, between the links 111 and 112, so that upon a forward movement of the paper carriage the links will swing downwardly and thereby move the inking roller, 110, lightly across the type faces of the printing sectors.

A paper feeding pawl, 113, is also pivotally mounted at the joint between the links 111 and 112, at one side of the machine. (See Fig. 10.) The nose of the paper feeding pawl, 113, engages a ratchet, 114, upon one end of the platen, 98, while the opposite end of the pawl is connected by a spring, 115, to the adjacent link, 112. When the paper carriage swings forward and the links, 111, move downward the nose of the pawl, 113, slides over the teeth of the ratchet, 114, although when the paper carriage swings rearwardly and the links, 111, swing upward the pawl, 113, engages the teeth of the ratchet, 114, so as to rotate the platen and cause a proper feeding of the paper web, 93. The paper is thus fed forward step by step as the machine is operated so that the successive numbers charged into the machine will be consecutively printed upon the paper in the form of a column.

The inking roller, 110, is removably mounted, being provided at opposite ends thereof with recesses, 110$^a$, adapted to receive pivot members. One of these recesses, 110$^a$, engages a pivot stud, 116, projecting from the junction of the links, 111 and 112, on the corresponding side of the machine, while the recess, 110$^a$, of the opposite end of the inking roller receives a pivot pin, 117, which is slidably mounted within a sleeve, 118, upon which the links, 111 and 112, together with the paper feeding pawl, 113, at the opposite side of the machine are pivoted. The outer end of the pivot pin, 117, is provided with a head, 117$^a$, which is engaged at the base thereof by one end of a spring arm 119. This spring arm, 119, normally holds the pivot pin in operative position, although by grasping the head, 117$^a$, the pivot pin can be pulled outwardly and completely disengaged from the inking roller. This construction admits of the inking roller being easily and quickly removed from or placed in position.

In the operation of the machine, the various numbers to be added and listed are charged successively into the same through the medium of the keyboard. As has been previously explained, there is one column of the keys, 5, for every digit of any number susceptible of being charged into the machine, and the key in each column having the numerical value of the corresponding digit of the number is depressed. This results in sliding the corresponding key locking slides, 10, rearwardly, so that the locking pawls, 20, of the corresponding registering slides, 11, are released. The main operating lever, 25, is next pushed downwardly to the full limit of its movement. The initial downward movement of the operating lever swings the cam plates, 35, so that the rollers, 38, on the cam actuated levers, 39, ride out of the notches, 36, onto the cam surfaces, 35$^a$, of the cam plates 35. (See Fig. 9). The cam actuated levers, 39, are thus swung upwardly so as to shove the hangers, 41, and shaft, 17, up, thereby lifting all of the numeral wheels, 16, so that the pinions, 15, thereof are out of mesh with the registering sectors, 13. As the operating lever, 25, is moved downwardly the transverse bar, 28, is moved rearwardly so as to place all of the springs, 29, under tension. This results, as has been previously explained, in swinging the registering sectors, 13, forward an amount corresponding to the numerical values of the depressed keys, 5, and also in setting the printing sectors, 91. When the main operating lever, 25, reaches the lower limit of its movement the printing is accomplished and the rollers, 38, of the cam actuated levers, 39, drop from the cam surfaces, 35$^a$, of the cam plates, 35, into the notches, 37. The cam actuated levers, 39, then swing downwardly so as to disengage the lateral arms, 39$^a$, at the ends thereof from the notches, 41$^a$, in the lower ends of the hangers, 41, whereupon the springs, 58, swing the hangers toward the front of the machine and the shaft, 17, is lowered to bring the pinions, 15, of the numeral wheels into mesh with the registering sectors, 13. When the operating lever, 25, reaches the lower limit of its movement, a pin, 120, upon the operating plate 26 (see Fig. 5) engages the lower end of a slot, 121, in a link, 122, pivotally connected at its upper end, as indicated at 123, to a lever, 124. This mechanism is duplicated at each side of the machine, the two levers, 124, carrying the resetting rod, 82, of the carrying mechanism and being each pivotally mounted upon the frame at an intermediate point in its length, as indicated at 125. Springs, 126, engage the levers, 124, and normally hold the same yieldably in operative position. When the pins, 120, reach the lower ends of the slots, 121, the levers, 124, are given a swinging movement which lifts the resetting rod, 82, of the carrying mechanism. Owing to the nature of the pin and slot connection between the links, 122, and the respective operating plates, 26 and 27, this upward movement of the resetting rod, 82, is momentarily produced at the time when the main lever, 25, reaches its extreme downward movement. This results in resetting the carrying mechanism in the manner previously described, simultaneously with lowering the number wheels, 16, into operative position. The return movement of the main operating lever, 25, causes the registering sectors, 13, to be returned to original position, the return movement of the said registering sectors producing the proper rotation of the numeral wheels, 16, and those registering sectors at points where the carrying mechanism has been operated moving backward one step farther than the other registering sectors, so that the numeral wheels, 16, will register the correct total of all the numbers charged into the machine. As the operating lever, 25, approaches the limit of its return movement, the trip levers, 62, are actuated by the cam plate, 35, so as to move the transverse rod, 63, and release the depressed keys, 5, as previously explained. At the end of the return movement of the lever, 25, the rollers, 38, of the levers, 39, drop from the cam surfaces, 35ª, of the cam plates, 35, into the notches, 36, so that the cam actuated levers, 39, swing downwardly into their original positions. The tension produced in the springs, 57, by the return movement of the levers, 55, through roller, 54, then swings the hangers, 41, back into their original positions with the notches, 41ª, thereof over the lateral arms, 39ª, of the levers, 39, so that the machine is ready to have another number charged into the same.

Means are provided for releasing the keys, 5, before operating the main lever, 25, to charge the number into the machine, in the event some error has been made in operating the keys, 5. For this purpose, an error key, 127, is provided at the right hand side of the machine and pivoted upon the shaft, 65. An arm, 127ª, bears loosely against the rod, 63, and a spring, 128, engaged the error key to normally hold the same yieldably in inoperative position. However, when this error key, 127, is depressed (see Fig. 8) the rod, 63, will be moved toward the rear of the machine, carrying with it the hangers, 64, and bar, 65, thereby releasing all of the keys, 5, so that they will be returned to normal position by the action of the springs, 6.

When it is desired to print the total upon the paper, a total key, 129, at the left hand side of the machine is depressed until handle is started, said total key being rigid with the shaft, 65, and being provided at the pivot end thereof with a downwardly extending arm, 129ª, which engages the rod, 63, of the key releasing mechanism. Rigid with the shaft, 65, at each end thereof, is a bell crank member, 59, one of the arms of each of the said bell crank levers extending upwardly and being connected by a link, 60, as has been previously described, to the corresponding hanger, 41. The opposite arm of the bell crank, 59, at the right hand side of the machine terminates at a point indicated by the dotted line $x$ on Fig. 9, while the corresponding arm of the bell crank member, 59, on the left hand side of the machine is provided at the extremity thereof with a laterally projecting flange, 130, which is adapted to ride upon a block, 131, secured to the face of the cam operating plate, 35. This extension, 59ª, of the bell crank member, 59, has a pin and slot connection, 132, with the lower end of a link, 133, the upper end of the link being pivotally connected to a crank arm, 134, rigid with the shaft, 92, upon which the printing sectors, 91, are loosely mounted. A signal arm, 135, is also rigid with the shaft, 82, so as to be swung upwardly into operative position when the link, 133, is pushed upwardly. The extremity of the signal arm, 135, is provided with a suitable printing chamber, 135ª, which will leave an impression upon the paper when the total is printed, thereby indicating that the number is a total and not merely another one of the consecutive numbers charged into the machine. A pin, 136, projects from the lower end of the link, 133, and is normally in substantial alinement with the front edge of the laterally projecting flange, 130, at the nose of the extensions, 59ª, of the bell crank member, 59.

When the total key, 129, is depressed, the rod, 63, of the key releasing mechanism is moved rearwardly, thereby disengaging the locking pawls, 20, from the registering slides, 11. Owing to the fact that both the total key, 129, and the two bell crank members, 59, are rigid with the shaft, 65, the said bell cranks will be rotated when the total key is depressed. The rotation of these two bell crank members, 59, will operate through the links, 60, to swing the hangers, 41, toward the front of the machine so that the notches, 130

41ª, at the lower ends thereof will not be engaged by the lateral arms, 39ª, at the ends of the cam operated levers, 39, when the main operating lever, 25, is moved downwardly. The extension, 59ª, of the bell crank member, 59, will simultaneously be swung upward so that upon the operation of the machine the flange, 130, and pin, 136, will ride upon the block, 131. It will also be observed that when the bell crank members, 59, are moved, the notched ends, 137ª, of pawls, 137, pivoted thereon, at 138, are brought into the path of stop pins, 139, upon the upper ends of the levers, 55. The total key, 129, is held in a depressed position while the main operating lever, 25, is pushed downwardly to the extreme limit of its movement. Owing to the fact that the hanger, 41, was swung forwardly out of the path of the ends of the cam actuated levers, 39, the pinions, 15, of the numeral wheels will remain in mesh with the registering sectors, 13, and will revolve in a backward direction until the trip fingers, 76, engage the noses, 77ª, of the carrying arms, 77, and the "0" characters on all of the numeral wheels are visible through the sight opening, 2ª. The movement of the registering sectors, 13, will operate to set the printing sectors, 91, the motion of the printing sectors being proportionate to the motion of the registering sectors, and the latter being determined in the present instance by the amount of backward rotation of the numeral wheels necessary to bring them to "0" position instead of by the system of stops controlled by the keys. When the main operating lever, 25, reaches the lower extreme of its movement, and the printing takes place, the flange, 130, upon the nose of the extension, 59ª, of the bell crank member, 59, will clear the block, 131, so that the bell crank member, 59, can swing back to its original position. The pin, 136, projecting from the link, 133, however, will remain upon the block, 131, so as to hold the signal arm, 135, in operative position during both the downward and return stroke of the main operating lever, 25. The bell crank members, 59, will thus drop into their original position when the main lever, 25, reaches the limit of its downward stroke, although the notched ends, 137ª, of the pawls, 137, will remain in engagement with the stop pins, 139, of the levers, 55, so as to hold the springs, 57, under tension and thereby cause the hangers, 41, to swing back into their original position. The springs, 57, are thus under tension and the hangers, 41, in normal position when the main lever, 25, starts on its return movement and the rollers, 38, of the cam operating levers, 39, ride out of the notches, 37, onto the cam faces, 35ª, of the cam plates, 35. The upward swinging movement imparted to the levers, 39, by this cam action will operate to lift the hangers, 41, and shaft, 17, so that the pinions, 15, of the numeral wheel, 16, will be lifted out of mesh with the registering sector, 13, and held in this position by the numeral wheel lock pawls heretofore mentioned, during the return movement of the operating lever. The numeral wheels will thus remain in "0" position so that the machine will be reset and ready to have another set of numbers charged into the same. When the main lever, 25, has completed its return movement, the pin, 136, upon the link, 133, will clear the block, 131, upon the cam plate, 35, and drop away from the said block, thereby permitting the signal arm, 135, to be swung downwardly into inoperative position by the action of the spring, 141. Simultaneously, the lever, 55, will be swung by roller, 54, a sufficient amount to disengage the stop pin, 139, thereon from the notch, 137ª, of the pawl, 137, thereby permitting the latter to drop into inoperative position, stop fingers, 140, resting on the upper edge of the member 59. A total has thus been printed upon the paper, the numeral wheels returned to "0" position, and the entire machine reset so that another set of numbers can be charged into the same.

In the event it may be merely desired to print a sub-total on the paper without interfering with the total as displayed by the numeral wheels, the total key, 129, is maintained in a depressed position by the hand during both the downward and return movement of the main operating lever, 25. The links, 60, will then prevent the hangers, 41, from swinging back to normal position when the operating lever, 25, reaches the lower limit of its movement, and the pinions, 15, of the numeral wheels, 16, will accordingly remain in mesh with the registering sectors, 13, during both the downward and return movement of the main lever. The total will then be printed exactly as in the previous instance, although upon the return of the main operating lever, 25, the numeral wheels, 16, will all be rotated back into their original positions. This enables a sub-total to be printed as often as desired without interfering with the entire total registered by the numeral wheels. If all the numeral wheels are at "0" when the total key, 129, is depressed, the action of the pawls, 24, controlling the printing mechanism, as previously explained, will hold all of the printing sectors, 91, in inoperative position so that only the signal arm, 135, will leave a printed impression upon the paper. In case one or all of the trip arms, 78, should be down, in other words, that carrying has taken place with previous item, transverse bar, 82, will be resting against nose, 59ᵇ, of members, 59, thus preventing the total button from being operated until an extra stroke with lever, 25, is made to clear or reload carrying mechanism.

Having thus described the invention, what I claim as new and desire to secure by Letters Patent, is:—

1. In an adding machine having the usual numeral wheels and shaft, and actuators for the wheels adapted to be brought into and out of engagement for adding purposes, and the usual reciprocating general operator; cam plates controlled by the general operator, hangers applied to the numeral wheel shaft and provided with seats, levers controlled by the cam plates and swung toward the seats of the hangers when the general operator reaches both limits of its movement, and means for swinging the hangers out of coöperative relation with the levers during one movement of the general operator, the numeral wheel shaft and numeral wheels being moved away from the actuators during the other movement of the general operator.

2. In an adding machine having the usual numeral wheels and shaft, and actuators for the wheels adapted to be brought into and out of engagement for adding purposes, and the usual reciprocating general operator; cam plates controlled by the general operator and formed with cam surfaces having notched seats at opposite ends thereof, hangers applied to the numeral wheel shaft and provided with seats, members actuated by the said cam plates to engage the seats of the hangers to move the numeral wheel shaft and disengage the pinions of the numeral wheels from the actuating means, rollers upon said members adapted to ride upon the surfaces of the cam plates and to enter the notched seats at opposite ends thereof when the general operator is at either end of its movement, the movement of the cam actuated member produced when the roller rides from one of the notched seats onto the cam surface being such as to bring it into coöperative relation with the corresponding hanger to move the numeral wheel shaft, and means for swinging the hangers out of coöperative relation with the cam actuated members during the return movement of the general operator.

3. In an adding machine having the usual numeral wheels, and shaft, and actuators for the wheels adapted to be moved into and out of engagement for adding purposes, and the usual reciprocating general operator; cam plates controlled by the general operator and formed with cam surfaces having notched seats at opposite ends thereof, hangers applied to the numeral wheel shaft and provided with seats, members actuated by said cam plates to engage the seats of the hangers to move the numeral wheel shaft and disengage the pinions of the numeral wheels from the actuating means, rollers upon said members adapted to ride upon the surfaces of the cam plates and to enter the notched seats at opposite ends thereof when the general operator is at either end of its movement, the movement of the cam actuated member produced when the roller rides from one of the notched seats onto the cam surface being such as to bring it into coöperative relation with the corresponding hanger to move the numeral wheel shaft, yielding means tending to swing the hangers out of coöperative relation with the cam actuated members, levers actuated by the cam plates and controlling the said yielding means, the relation between the said levers and the cam plates being such that the yielding means is permitted to swing the hangers into inoperative position during the return movement of the general operator.

4. In an adding machine having the usual numeral wheels and shaft, and actuators for the wheels movable into and out of engagement for adding purposes, and the usual reciprocating general operator; cam plates controlled by the general operator and formed with cam surfaces having notched seats at opposite ends thereof, hangers applied to the numeral wheel shaft and provided with seats, members actuated by the said cam plates to engage the seats of the hangers to move the numeral wheel shaft and disengage the pinions of the numeral wheels from the actuating means, rollers upon said members adapted to ride upon the surfaces of the cam plates and to enter the notched seats at opposite ends thereof when the general operator is at either end of its movement, the movement of the cam actuated member produced when the roller rides from one of the notched seats onto the cam surface being such as to bring it into coöperative relation with the corresponding hanger to move the numeral wheel shaft, springs connected to the hangers and normally tending to swing the same into inoperative position, levers, springs connecting the levers and the hangers and serving when in action to counteract the before mentioned springs and hold the hangers in operative position, and means upon the cam plates for moving the levers to control the springs so that the hangers are held in operative position during the forward movement of the general operator and permitted to swing into inoperative position during the return movement of the general operator.

5. An adding machine including a series of registering sectors, selective stop means for limiting the forward movement of each registering sector, a shaft upon which the registering sectors are mounted, registering means actuated by the registering sectors, levers loose upon the shaft adjacent the registering sectors, locking means normally holding the levers against movement, means for automatically releasing the locking means when the registering sector is operated, yielding connections between the levers and the respective registering sectors for producing an initial movement of the lever when first released and then locking it with the registering sector, and printing mechanism operatively connected to the levers, said printing mechanism being normally in inoperative position and the initial movement of the lever bringing the zero character thereof into printing position.

6. An adding machine including a series of registering sectors, selective stop means for limiting the movements of the registering sectors, a shaft upon which the registering sectors are mounted, registering means actuated by the registering sectors, levers loose upon the shaft adjacent the registering sectors, locking pawls engaging the levers to normally hold them against movement, means for releasing any locking pawl upon the actuation of the corresponding registering sector, an operative connection between the locking pawls for simultaneously releasing all of the locking pawls to the right thereof when any particular locking pawl is released, yielding connections between the levers and the respective registering sectors for producing an initial movement of the lever when first released and then locking it with the registering sector, and printing means operatively connected to the various levers and provided with type characters "0" to "9" inclusive, the printing mechanism being normally in an entirely inoperative position and the initial movement of the levers serving to bring the "0" type characters into printing position.

7. An adding machine including a series of registering sectors, selective stop means for limiting the movements of the registering sectors, a shaft upon which the registering sectors are mounted, registering means actuated by the registering sectors, levers loose upon the shaft adjacent the registering sectors, locking pawls engaging the levers and normally holding them against movement, cam means actuated by the registering sectors for automatically releasing the locking pawls when the registering sectors are moved, and printing mechanism operatively connected to the levers.

8. An adding machine including a series of registering sectors, key actuated selective stop means for limiting the forward movement of each registering sector when the magnitude of the said forward movement is proportionate to the numerical value of the depressed key, a shaft upon which the registering sectors are mounted, registering means actuated by the registering sectors, levers loose upon the shaft adjacent the registering sectors, locking pawls engaging the levers, cam means actuated by the registering sectors for releasing the locking pawls, a yielding connection between the levers and the respective registering sectors, printing sectors having operative connections with the respective levers, and means for operating the registering sectors.

9. An adding machine including a series of registering sectors, key actuated selective stop means for limiting the forward movement of each registering sector when the magnitude of the said forward movement is proportionate to the numerical value of the depressed key, registering means actuated by the registering sectors, a shaft upon which the registering sectors are mounted, levers loose upon the shaft adjacent to the registering sectors, locking pawls engaging the levers, cam means actuated by the registering sectors for releasing the locking pawls, an operative connection between the locking pawls whereby when any one of the locking pawls is released all of the locking pawls to the right thereof are simultaneously released, a yielding connection between the levers and the respective registering sectors for producing an initial movement of the lever when first released and then locking it with the registering sector during the remainder of the operation of the machine, printing sectors having operative connections with the respective levers and provided with the type characters "0" to "9" inclusive thereon, the printing sectors being normally in an entirely inoperative position and the initial movement of the levers serving to move the respective printing sectors to bring the "0" character into printing position, and means for operating the registering sectors.

10. An adding machine including a series of registering sectors, key actuated selective stop means for limiting the forward movement of each registering sector when the magnitude of the said forward movement is proportionate to the numerical value of the depressed key, registering means actuated by the registering sectors, a shaft upon which the registering sectors are mounted, levers loose upon the shaft adjacent to the registering sectors, locking pawls engaging the levers, cam means actuated by the registering sectors for releasing the locking pawls, said locking pawls being each provided with a seat, an arm projecting laterally from each locking pawl and engaging the seat of the locking pawl to the right thereof so that when any one of the locking pawls in released all of the locking pawls to the right thereof are simultaneously released, a yielding connection between the levers and the respective registering sectors for producing an initial movement of the lever when first released and then locking it with the registering sector during the remainder of the operation of the machine, printing sectors, links connecting the printing sectors to the respective levers, said printing sectors being each provided with the type characters "0" to "9" inclusive and the "0" character being normally in inoperative position but being brought into printing position by the initial movement of the lever when the latter is released, and means for operating the registering sectors.

11. An adding machine including a series of registering racks, selective stop means limiting the movements of the racks, registering means actuated by the registering racks, printing sectors having an operative connection with the registering racks, a movable paper carriage, a platen upon the paper carriage, a general operator, means operatively connected with the general operator for moving the registering racks and moving the paper carriage to bring the platen toward the printing sectors, and means actuated by the movement of the paper carriage for inking the printing sectors.

12. An adding machine including a series of registering racks, selective stop means for limiting the forward movement of the racks, registering means actuated by the registering racks, printing sectors having an operative connection with the registering sectors, a paper carriage, a platen upon the paper carriage, a general operator operatively connected with the registering racks and with the paper carriage for moving the latter toward the printing sectors, pivotally connected arms between the adding machine and paper carriage, and an inking roller at the pivotal connection of the said arms, said inking roller being moved over the printing sectors when the paper carriage is actuated.

13. An adding machine including a series of registering racks, selective stop means for limiting the movements of the racks, registering means actuated by the racks, printing sectors having an operative connection with the registering racks, a paper carriage, a platen upon the paper carriage, a general operator having an operative connection with the registering racks and the paper carriage for moving the latter toward the printing sectors, pivotally connected arms betwen the paper carriage and adding machine, an inking roller at the pivotal connection of the arms so that the movement of the arms swings the inking roller over the printing sectors when the carriage is actuated, and paper feeding means also actuated by the movements of the said pivotally connected arms.

14. An adding machine including a series of registering racks, selective stop means limiting the forward movements of the registering racks, numeral wheels actuated by the registering racks, carrying means arranged between adjacent numeral wheels and including trip levers, printing sectors operatively connected with the registering racks, a paper carriage, a platen upon the paper carriage, a general operator operatively connected with the registering racks, plates controlled by the general operator, a rock shaft having an operative connection with the general operator, means actuated by the rock shaft for moving the paper carriage to bring the platen toward the printing sectors, a resetting rod for the trip levers of the carrying means, and an operative connection between the resetting rod and the before mentioned plates.

15. In an adding machine having the usual numeral wheels, and shaft and actuators for the wheels movable into and out of engagement for adding purposes, and the usual reciprocating general operator; hangers applied to the numeral wheel shaft and provided with seats, cam actuated members controlled by the general operator and moved into position for engagement with the seats of the hangers when the general operator is at either end of its movement, means for normally moving the hangers into inoperative position during one movement of the general operator, a total key, means actuated by the total key for reversing the movements of the hangers, and printing sectors operatively connected with the actuating means.

16. In an adding machine having the usual numeral wheels, and shaft and actuators for the wheels movable into and out of engagement for adding purposes, and the usual reciprocating general operator; cam plates controlled by the general operator, hangers applied to the numeral wheel shaft and provided with seats, members actuated by said cam plates and moved into position to engage the seats of the hangers and disengage the pinions of the numeral wheels from the actuating means when the general operator is at either end of its movement, means for swinging the hangers into an inoperative position upon one actuation of the said members, a total key, means actuated by the total key for reversing the movements of the hangers and swinging them into inoperative position during the other actuation of the members, and printing sectors operatively connected with the actuating means.

17. In an adding machine having the usual numeral wheels, and shaft and actuators for the wheels movable into and out of operative engagement for adding purposes, and the usual reciprocating general operator; hangers applied to the numeral wheel shaft and provided with seats, cam plates controlled by the general operator, members actuated by the said cam plates and moved into position for engagement with the seats of the hangers to move the numeral wheel shaft and disengage the pinions of the numeral wheels from the actuating means at each end of the movement of the general operator, means for swinging the hangers into inoperative position at one actuation of the said members, a total key, means actuated by the total key for swinging the hangers into inoperative position, means set by the operation of the total key for causing the hangers to be returned to operative position when the total key is released, and printing sectors operatively connected with the actuating means, a total being printed when the total key is depressed during one movement of the general operator and released during the return movement thereof, while a sub-total is printed when the total key is held depressed during both movements of the general operator.

18. In an adding machine having the usual numeral wheels, and shaft and actuators for the wheels movable into and out of engagement for adding purposes, and the usual reciprocating general operator, hangers applied to the numeral wheel shaft and provided with seats, cam plates controlled by the general operator, members actuated by the cam plates and moved into position to engage the seats of the hangers to move the numeral wheel shaft and disengage the pinions of the numeral wheels from the actuating means at each end of the movement of the general operator, a total key, means actuated by depression of the total key for swinging the hangers into inoperative position, means set by the actuation of the total key for causing the hangers to be returned to operative position when the total key is released, means for locking the total key in a depressed position during one movement of the general operator, and printing sectors operatively connected to the actuating means, a total being printed when the total key is permitted to be released during the return movement of the general operator, while a sub-total is printed when the total key is held depressed during the return movement of the general operator.

19. In an adding machine having the usual numeral wheels, and shaft and actuators for the wheels movable into and out of engagement for adding purposes, and the usual reciprocating general operator; cam plates controlled by the general operator, hangers applied to the numeral wheel shaft and provided with seats, members actuated by said cam plates and moved into position for engaging the seats of the hangers to move the numeral wheel shaft and disengage the pinions of the numeral wheels from the actuating means when the general operator is at either end of its movement, means for moving the hangers into inoperative position upon one actuation of the said members, a total key, means actuated by the total key for swinging the hangers into inoperative position at the other actuation of the said members, means set by the total key for causing the hangers to be returned to operative position when the total key is released, printing sectors operatively connected to the actuating means, and a printing signal arm actuated by the total key for coöperation with the printing sectors to indicate that the numeral printed is a total.

20. In an adding machine having the usual numeral wheels, and shaft and actuators for the wheels movable into and out of engagement for adding purposes, and the usual reciprocating general operator; cam plates controlled by the general operator and formed with cam surfaces having notched seats at opposite ends thereof, hangers applied to the numeral wheel shaft and provided with seats, members actuated by said cam plates to engage the seats of the hangers to move the numeral wheel shaft and disengage the pinions of the numeral wheels from the actuating means, rollers upon said members adapted to ride upon the surfaces of the cam plates and to enter the notched seats at opposite ends thereof when the general operator is at either end of its movement, the movement of the cam actuated member produced when the roller rides from one of the notched seats onto the cam surface being such as to bring it into position for engagement with the seat of the corresponding hanger, means for swinging the hangers into inoperative position upon one actuation of the said members, a total key, means actuated by the total key for producing a reversal of the sequence of the movements of the hangers, and printing sectors operatively connected with the actuating means.

21. In an adding machine having the usual numeral wheels, and shaft and actuators for the wheels movable into and out of engagement for adding purposes, and the usual reciprocating general operator; hangers applied to the numeral wheel shaft and provided with seats, cam plates controlled by the general operator, members actuated by said cam plates and moved into position for engagement with the seats of the hangers when the general operator is at either end of its movement, means for swinging the hangers into inoperative position at one actuation of the said members, a total key, means actuated by the total key for moving the hangers into inoperative position at the other actuation of the said members, springs connected to the hangers and tending to return them to operative position, means actuated by the total key for placing the said springs under tension so as to return the hangers to operative position as soon as the total key is released, and printing sectors operatively connected with the actuating means.

22. An adding machine including a series of registering sectors, key actuated selective stop means for limiting the forward movement of each of the registering sectors when the magnitude of the said forward movement is proportionate to the numerical value of the depressed key, numeral wheels, pinions applied to the numeral wheels and adapted to mesh with the registering sectors, a shaft upon which the numeral wheels are journaled, a main operating shaft, cam plates rigid with the main shaft, means actuated thereby for moving the numeral wheel shaft to disengage the pinions of the numeral wheels from the registering sectors during the forward movement of the registering sectors and bring them back into engagement during the return movement of the registering sectors, a total key, means actuated by the total key for reversing the sequence of engagement between the pinions and the registering sectors, means for stopping the backward rotation of the numeral wheels when the zero point is reached, printing sectors having operative connections with the respective registering sectors, a paper carriage, and means for bringing the paper carriage into printing engagement with the printing sectors upon each actuation of the machine.

23. An adding machine including a series of registering sectors, key actuated selective stop means for limiting the forward movement of each of the registering sectors when the magnitude of the said forward movement is proportionate to the numerical value of the depressed key, numeral wheels, pinions applied to the numeral wheels and adapted to mesh with the registering sectors, a shaft upon which the numeral wheels are journaled, a main operating shaft, means actuated thereby for moving the numeral wheel shaft to disengage the pinions of the numeral wheels from the registering sectors during the forward movement of the registering sectors and bring them back into engagement during the return movement of the registering sectors, a total key, means actuated by the total key for reversing the sequence of engagement between the pinions and the registering sectors, means for stopping the backward rotation of the numeral wheels when the "0" point is reached, printing sectors having operative connections with the respective registering sectors, a paper carriage, means actuated by the main shaft for bringing the paper carriage into printing engagement with the printing sectors, and means actuated by the main shaft for operating the registering sectors.

24. An adding machine including a series of registering sectors, key actuated selective stop means for limiting the forward movement of each of the registering sectors when the magnitude of the said forward movement is proportionate to the numerical value of the depressed key, numeral wheels, pinions applied to the numeral wheels and adapted to mesh with the registering sectors, a shaft upon which the numeral wheels are journaled, a main operating shaft, means actuated thereby for moving the numeral wheel shaft to disengage the pinions of the numeral wheels from the registering sectors and bring them back into engagement during the return movement of the registering sectors, a total key, means actuated by the total key for reversing the sequence of engagement between the pinions and the registering sectors, means for stopping the backward rotation of the numeral wheels when the "0" point is reached, printing sectors having operative connections with the respective registering sectors, a paper carriage, means actuated by the main shaft for bringing the paper carriage into printing engagement with the printing sectors, a printing signal arm actuated by the total key for coöperation with the printing sectors to indicate that the number printed when the total key is depressed is a total, and means actuated by the main shaft for operating the registering sectors.

In testimony whereof, I have hereunto signed my name in the presence of two subscribing witnesses.

FREDRICK W. B. SCHORADT.

In the presence of—
 CLARENCE A. WILLIAMS,
 JOHN H. RONEY.